UNITED STATES PATENT OFFICE.

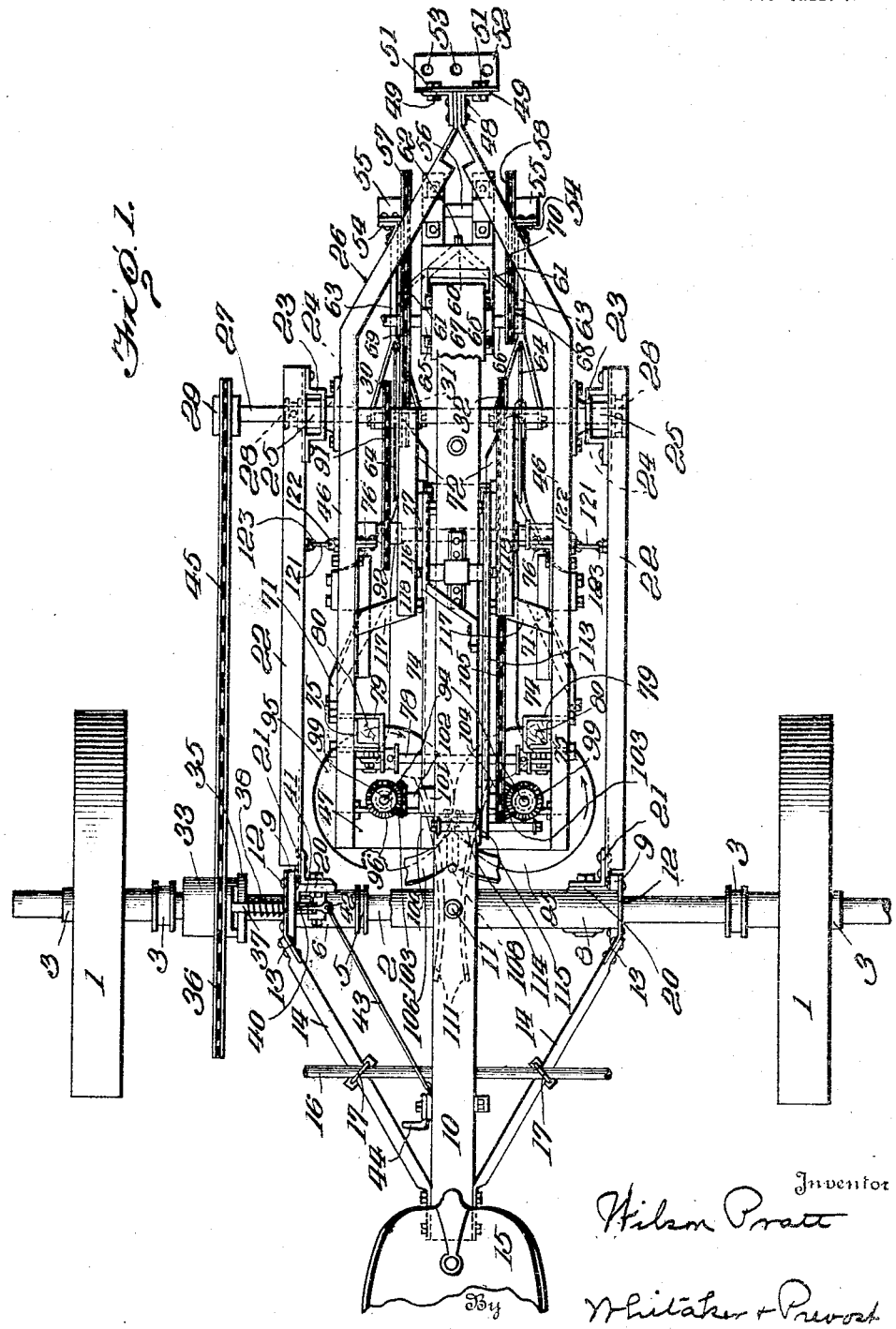

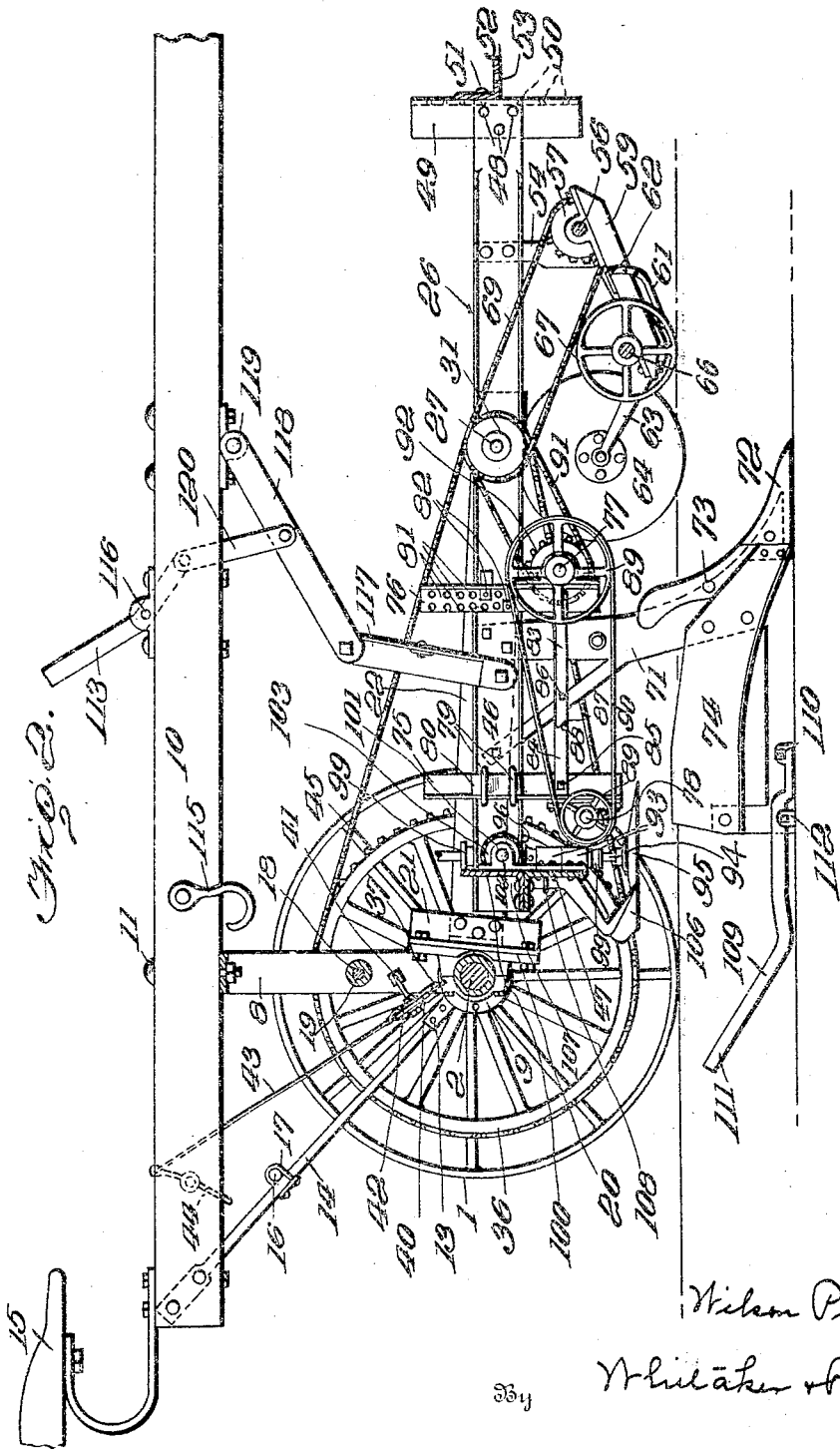

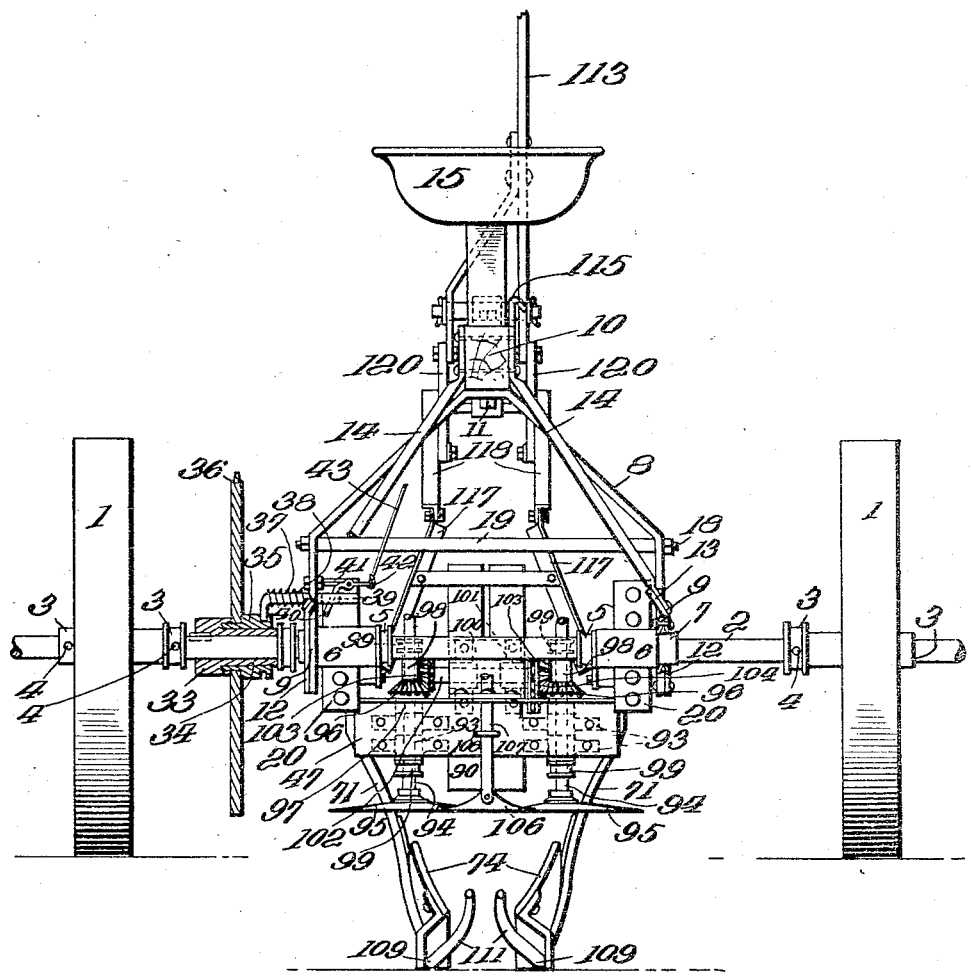

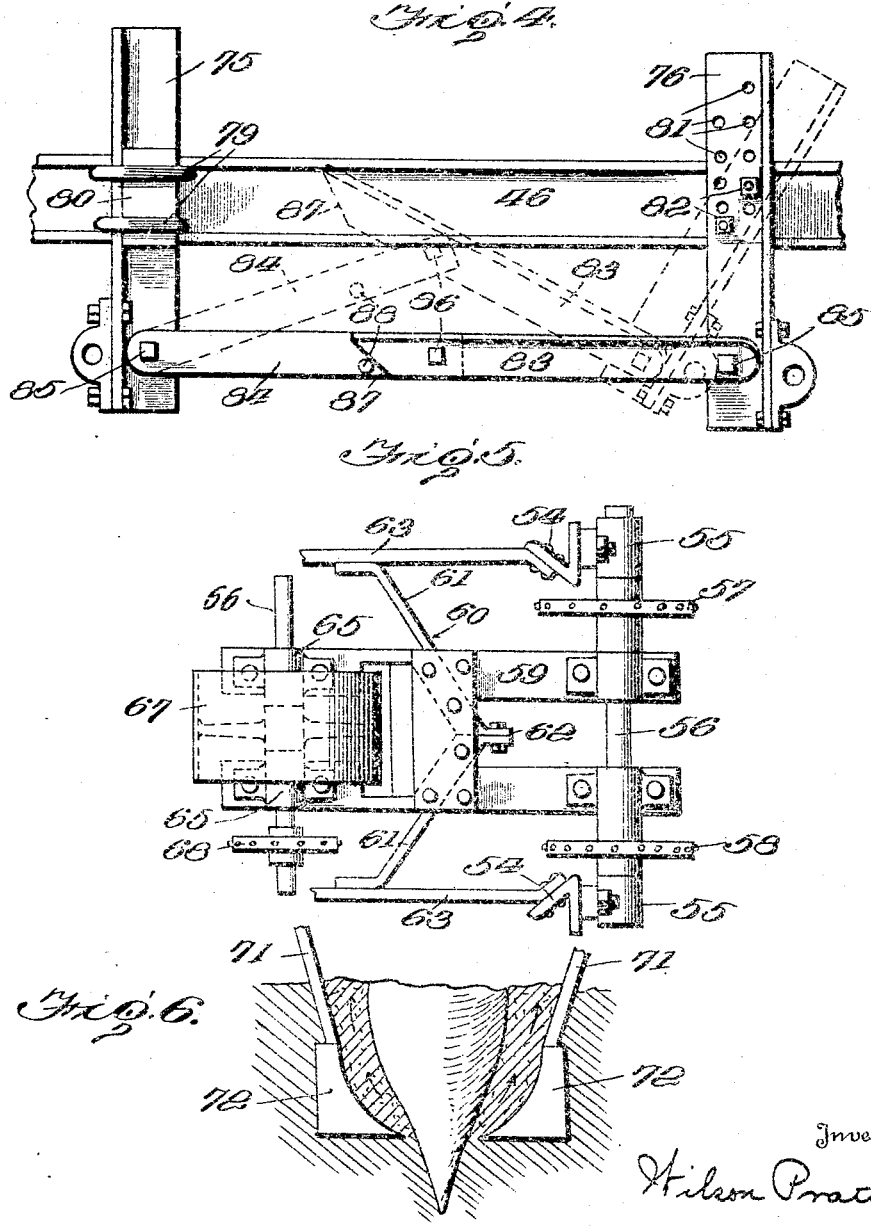

WILSON PRATT, OF SALT LAKE CITY, UTAH.

BEET-HARVESTER.

1,287,428.  Specification of Letters Patent.  Patented Dec. 10, 1918.

Application filed May 24, 1917. Serial No. 170,646.

*To all whom it may concern:*

Be it known that I, WILSON PRATT, a citizen of the United States, residing at Salt Lake City, in the county of Salt Lake and State of Utah, have invented certain new and useful Improvements in Beet-Harvesters; and I do hereby declare the following to be a full, clear, and exact description of the invention, such as will enable others skilled in the art to which it appertains to make and use the same.

My invention relates to beet harvesting. I have found by investigation in beet fields, that all beets regardless of size have practically the same amount of waste crown or top, or in other words, that the waste portion of all the beets extends practically the same distance from the stem of the beet toward the lower end of the same and I have, therefore, devised a machine which will bring the crowns of all of the beets to the same height or level, so that each beet may be cut the same distance below its stem. By this mechanism, I can accurately top the beets and remove the waste portion of the same without removing any of the sugar containing portion.

I have also found that the crowns of the beets grow out of the soil varying distances, which range from a fraction of an inch to approximately four inches. It is, therefore, desirable to bring the crowns growing out of the soil a less distance than the crowns of the tallest beets, to the same level or height as the crowns of the tallest beets, and then hold the elevated beets at this height until they can be cut or severed the same distance below their stems, in order to remove the waste portion of the beets.

My beet topping and harvesting machine includes elevating plows which first loosen the soil surrounding the beets and then elevate the beets whose crowns grow above the ground a less distance than the crowns of the tallest beets, until the crowns of the beets are engaged by a leveling or gaging mechanism which prevents the beets rising beyond the same and thereby brings the crowns of the beets to a uniform height or level. The elevated beets and the soil surrounding them are held in elevated position by the plows until the beets are topped, and this prevents the beets from dropping back after they have been elevated. I set my leveling or gaging means so that it will just contact with the crowns of the tallest beets, while the beets of less height will be elevated until their crowns engage the leveling means and as this brings all of the beet crowns to the same height or level, I can then cut the same amount of top or crown from each beet regardless of its length.

One of the objects of my invention is to provide mechanism in a machine of this character which will spread or divide the leaves and crush their stems against their crowns before they are operated upon by the leveling mechanism, for the purpose of permitting the leveling mechanism to positively engage the beet crowns without contacting with any intermediate leaves or stems, so that the beets may be accurately topped.

Another object of my invention is to so arrange the plows, leveling mechanism and crown cutters, that the beets whose crowns grow a less distance above the soil than the crowns of the tallest beets, together with the soil surrounding them, will be elevated by the plows until their crowns engage the leveling or gaging mechanism and the elevated beets will be leveled and topped while they are in engagement with the leveling mechanism and supported in the soil by the elevating plows, whereby the cutters will operate upon the beets while they are positively engaged at their crowns by the leveling mechanism and positively supported in the loosened soil.

Another object is to provide an improved frame work, which supports all of the foregoing mechanism and a single lever for lifting the entire mechanism into inoperative position when the machine is not in use.

A still further object is to provide a mechanism of this character which is supported by two traction wheels only, so that the machine may be turned in a small space and can be accurately guided over the beet rows.

With the foregoing objects outlined and with other objects in view, which will appear as the nature of the invention is better understood, my invention consists in the novel features hereinafter described, illustrated in the accompanying drawings and more particularly pointed out in the appended claims.

Referring to the drawings,

Figure 1 is a top plan view of my improved machine.

Fig. 2 is a vertical longitudinal sectional view of the same.

Fig. 3 is a rear view partly in section.

Fig. 4 is a detail showing the means for tightening the beet leveling belt.

Fig. 5 is a top plan view of a detail showing the leaf divider and stem bruiser wheel.

Fig. 6 is a diagrammatic view of the front portions of the plows looking from the rear and showing the manner of lifting the beets and the soil which surrounds the same.

In the drawings, 1 represents the two traction wheels upon which the entire beet harvesting mechanism is supported. These wheels are mounted on an axle 2 and have ratchet mechanism (not shown) which connects them with the axle so that when the machine is moved in a forward direction the wheels will turn said axle, but when moved rearwardly the axle will remain idle. The wheels may be adjusted along the axle and locked in adjusted positions by means of collars 3 and set screws 4.

Mounted on the axle 2 and spaced apart by the set screw collars 5, are bearings 6 having hub extensions 7. An inverted U-shaped supporting bracket 8 has its lower ends 9 resting on the hubs 7 and is bolted at its upper end to the stub tongue 10 by the bolt 11. The forward portion of the tongue extends beyond the drawings and is supported by the horses which draw the machine over the beet rows. Disks 12 are riveted to the lower ends of the bracket 8 and carry angularly bent tongues 13 which are riveted to the lower ends of the brace rods 14, the upper ends of said rods being bolted to the rear end of the stub tongue 10.

The operator's seat 15 is carried by the stub tongue 11 and a foot rod 16 is secured to the brace rods 14 by U-bolts 17 within convenient reach of the operator's feet. A rod 18 braces the bracket 8 and a sleeve 19 encircles said rod and spaces the legs of the bracket.

The bearings 6 carry brackets 20 which are bolted to angle irons 21 which in turn are bolted to and carry the rear ends of side bars 22. These side bars 22 are provided at their forward ends with bearing brackets 23, each having an aperture 24 for the reception of a hollow stud 25, one of which is bolted to each side of the mechanism frame 26. Passing through these hollow studs is a shaft 27 carrying set collars 28, which secure the side bars 22 to the mechanism frame 26 and this shaft carries sprocket wheels 29, 30, 31 and 32 for a purpose hereinafter described.

Keyed to the axle 2 is the fixed member 33 of a clutch and slidably mounted on an extension 34 of said member is the movable member 35 of said clutch. The movable member 35 rigidly supports a sprocket wheel 36, which when the clutch is in, drives the beet treating mechanism, hereinafter described. The clutch is operated by a forked rod 37 which is slidably mounted in the lower portion of one of the legs of the bracket 8 and is provided on one side of said leg with a spring 38, which normally holds the clutch in, and on the opposite side of said leg with a longitudinally disposed slot 39, in which operates one arm 40 of a bell crank lever that is pivoted to the bracket 41 carried by the left leg of the bracket 8, the other arm 42 of the lever being connected by a wire 43 to an operating handle 44 arranged adjacent the operator's seat.

A sprocket chain 45 connects the sprocket wheels 36 and 29 for imparting movement to the shaft 27.

The mechanism frame 26 consists of side channel irons 46 connected together at their rear ends by the angle iron 47 and having their front ends bent inwardly toward each other and connected together by rivets 48, which also secure vertical angle irons 49 to the mechanism frame. These vertical angle irons are provided with a series of vertically arranged apertures 50 for the reception of bolts 51 which adjustably secure a horizontal angle iron 52 to said vertical angle irons, so that the depth at which the plows operate (hereinafter described) may be varied, and the angle iron 52, is provided with a series of horizontally arranged apertures 53 for the reception of the side draft attachments.

A pair of vertical angle bars 54 have their upper ends riveted to the side irons 46 of the frame 26 and carry at their lower ends bearings 55, which support a horizontal shaft 56 carrying fixed sprocket wheels 57 and 58. The shaft 56 also carries a pivotally mounted frame 59 supporting the V-shaped leaf divider 60, which consists of two diverging resilient rods 61, which are connected together at their upper ends and extend downwardly and outwardly toward their lower ends. As the machine moves over the beet rows the central portion 62 of the leaf divider engages the leaves of the beets and parts or divides them, then as the machine proceeds the divided leaves are forced downwardly until the outer ends of the rods 61 are reached. Then the leaves are held down by the arms 63 which have their forward ends secured to the bars 54 and carry at their rear ends the vertical cutting disks 64 which shear the flattened leaves. The lower end of the pivoted frame 59 is provided with bearings 65, carrying a loose shaft 66 on which is rigidly mounted a bruiser wheel 67 and a sprocket wheel 68. A sprocket chain 69 connects the sprocket wheels 31 and 57 and a sprocket chain 70 connects the sprocket wheels 58 and 68, so that the bruiser wheel is positively rotated as the machine moves forward over the beet row. The function of this wheel is to bruise or mash the beet leaf stems adjacent the beet crowns, whereby the leveling mechanism, hereinafter described, will come into direct contact with the crowns without encountering the thick stems. This renders the topping more uniform and accurate.

Rigidly connected at their upper ends to the side bars 46 of the frame 26 are plow standards 71, which are provided at their lower forward ends with plow points 72 for loosening the earth surrounding the beets. These standards are provided with shin guards 73 for protecting the forward faces of the standards, and have secured to their inner sides elevating planes 74 which, as the machine moves forward, elevate the beets whose crowns grow a less distance above the soil than the crowns of the tallest beets and the loosened soil surrounding the same to a position where the beet crowns are engaged by the leveling mechanism, described later. As shown in Fig. 6, the points 72 are nearer to each other at their lower ends than at their upper portions, so that as the machine moves forward the loosened earth with the beets will have a tendency to travel upward, as shown by the arrows, and the loosened soil will pack around the beets to firmly support the same.

Rigidly suspended from each of the side irons 46 are vertical posts 75 and 76, the front pair of which carry a shaft 77 and the rear pair of which support a shaft 78. The rear pair of posts 75 are adjustably secured to said side irons by means of U-bolts 79 and wood chocks 80, and the front pair of posts 76 are provided with a series of apertures 81 for the reception of bolts 82, which adjustably secure the front posts to the side irons 46. As best shown in Fig. 4 the front and rear posts of each side iron 46 are connected together by links 83 and 84. These links are connected to the posts by pivot pins 85 and are fastened together by pivot pins 86. The rear ends of the links 83 are provided with inclined nose portions 87, which engage studs 88 on the rear links when the parts are in the position shown in full lines in Fig. 4. Rigidly mounted on the shafts 77 and 78 are pulleys 89, which carry the beet leveling belt 90. To place the leveling belt on the pulleys 89, the lower bolts 82 which secure the posts 76 to the side irons 46 are removed and said posts and the links 83 and 84 are swung into the position shown in dotted lines in Fig. 4. The belt is then placed upon the pulleys and the posts 76 brought back to the full line position and the lower bolts 82 replaced.

This leveling belt 90 is parallel to the surface of the soil and the rear pulley 89 is placed above the soil a sufficient distance to permit the belt to engage the crowns of the beets whose crowns grow above the soil a less distance than the crowns of the tallest beets, after they have been elevated with the soil that surrounds the same, by the elevating planes 74 while the front pulley 89 is sufficiently high above the soil to permit the belt to engage the crowns of the highest beets and force the same back into the soil the proper distance, so that the sun blistered top or waste portion of each beet only is severed from the beet by the cutters, which will be described later. The machine discerns between the different beets in the following manner: The beets whose crowns grow entirely out of the soil come into contact with the leveling belt 90 and are forced back into the soil a sufficient distance to permit the same amount of the waste portion only of these beets to be severed, while the beets whose crowns grow a less distance above the surface of the soil or less than the distance between the surface of the soil and the rear pulley 89, cannot be raised beyond the leveling belt and are elevated the proper distance to have their waste portions removed. The travel of the belt backward is equal to the forward travel of the machine.

The leveling belt is operated by means of a sprocket chain 91, which engages a sprocket wheel 92 keyed to the shaft 77, and the sprocket wheel 30 on the shaft 27.

Secured to the forward face of the rear plate 47 of the mechanism frame 26 are vertical bearings 93 in which are adjustably mounted vertical shafts 94 carrying at their lower ends the horizontal topping disks 95 which are rotated in the direction of the arrows shown in Fig. 1. These shafts 94 are provided with bevel gears 96 which are adjustably secured to the same by set screws 97 and mounted upon the shafts above the gears are spacing collars 98. Set screw collars 99 are secured to the shafts 94 above the collars 98 and below the bearings 93 for the purpose of adjusting the topping disks 95 relative to the surface of the soil. An angle plate 100 is secured to the upper surface of the plate 47 and carries on its forward face, bearings 101 which support a horizontal shaft 102 carrying bevel gears 103 which mesh with the bevel gears 96 and the shaft 102 also carries a sprocket wheel 104, operated by a sprocket chain 105 from the sprocket wheel 32 on the shaft 27. It will thus be seen that, as the machine travels forward, the sprocket wheel 32 through the chain 105 operates the gears 103 and 96 and thus causes the topping disks 95 to rotate in opposite directions, and as these disks rotate they sever the tops from the beets, while said beets are held in raised position in the soil by the elevating planes 74 of the plows.

After the crowns are removed from the beets they travel upon the disks 95 until they are engaged by a scraper 106, which removes them from the disks and throws them to the sides of the beet row. This scraper is carried by a post 107 which has its upper end passing through apertures in the horizontal portions of the plates 47 and 100 and is adjustably secured to the plate 47 by means of a U-bolt 108.

The topped beets are removed from the soil by means of harvester rods 109 which are pivotally connected to the rear ends of the plow standards, as shown at 110 and have their rear portions bent inwardly and upwardly as shown at 111 for the purpose of engaging the beets beneath their largest circumferences and raising the same out of the loosened soil. These rods are prevented from moving downwardly by the stops 112.

The mechanism frame 26 together with the parts which it carries, is adapted to be raised upwardly when the machine is not in use by means of the lever 113 having an operating handle 114. This handle is engaged by a hook 115 carried by the tongue 10 when the frame is raised for the purpose of holding the frame 26 in raised position. The lever is connected to the tongue 10 by a bolt 116 and has its front end forked to straddle the tongue. Pivotally secured to the side irons 46 of the mechanism frame 26, are links 117 to the upper ends of which are pivotally fastened links 118 which in turn have their upper ends pivotally connected to the tongue as shown at 119. Links 120 connect the lower forked ends of the lever 113 to the intermediate portion of the links 118 so that when the upper end of the lever 113 is moved rearwardly and downwardly, it will raise the intermediate frame.

As best shown in Fig. 1 the forwardly extending side bars 22 are connected to the side irons 46 of the mechanism frame, in the rear of the shaft 27, by means of elongated open links 121 which engage eyes 122 on the side irons 46 and eyes 123 on the bars 22, the purpose of which is to permit the mechanism frame 26 when the lever 113 is depressed, to swing about the shaft or pivot 27 until the rear ends of the plows are raised entirely from the soil and the front ends of the plows penetrate the soil only slightly. At this time the eyes 122 engage the upper ends of the links 121 and lift them until their lower ends come into engagement with the eyes 123 of the side bars 22 and from this point the side bars 22 are raised with the mechanism frame and the mechanism is swung about the axle or pivot 2.

The operation of my improved machine is as follows: Assuming that the crowns of the tallest beets extend approximately four inches above the soil, I adjust the height of the leveling belt to four inches above the soil, so that it will engage the tops of the tallest beets without elevating said beets. I then adjust the height of the cutters 95 to a position sufficiently below the leveling belt to remove the proper amount of crown. Then as the machine moves over the beet row, the leaf divider 61 will part or spread the leaves and the cutters 64 will cut the flattened leaves. Just prior to cutting the leaves, the bruiser wheel 67 will come into contact with the leaf stem and mash or crush the same against the beet crown. Then the plows will loosen the soil surrounding the beet and if the beet is of less height above the ground than the crowns of the tallest beets, they will elevate said beet until its crown engages the leveling belt and support said beet together with the soil which surrounds the same until its top has been removed by the cutters 95. If a beet extends above the soil a sufficient distance to engage the leveling belt 90, without being elevated, it will remain in its original position in the soil until it is topped. It will, therefore, be seen that at the time of topping all of the beets extend above the soil the same distance and the cutters 95 will remove the same thickness from each beet regardless of its size. After the beets have been topped they are raised from the soil by the harvester rods 109.

What I claim and desire to secure by Letters Patent is:—

1. The combination with a beet harvester, of means for loosening the soil surrounding the beets in a beet row and for elevating the beets, whose crowns extend a less distance above the ground than the crowns of the tallest beets, together with the soil which surrounds the same, means for preventing the elevated beets from being elevated beyond the crowns of the tallest beets, and means for topping the beets while the tallest beets are supported in the soil and the beets of less height together with the soil which surrounds the same are held in elevated position by the elevating means.

2. The combination with a beet harvester, of means for elevating the beets together with the soil surrounding them, before the beets have been topped, means for preventing the beets from being raised beyond a predetermined height, and means for topping the beets while they are held in raised position by the elevated soil.

3. The combination with a beet harvester, of means for elevating the beets, together with the soil which surrounds the same, before the beets have been topped, means for preventing the beets from being raised beyond a predetermined height, and means for topping the beets while they rest in the soil supported by said elevating means.

4. The combination with a beet harvester, of means for elevating the beets, together with the soil which surrounds the same, before the beets have been topped, means for preventing the beets from being raised beyond a predetermined height, means for uniformly topping the beets while they rest in the soil supported by said elevating means.

5. In a beet harvesting machine, a leaf divider for dividing the leaves and spreading the same laterally, means for bruising the leaf stems adjacent the crowns of the beets, means for loosening the soil surrounding the beets and for elevating the beets of less height than the tallest beets, together with the soil which surrounds the same, means for preventing the elevated beets from rising above the tallest beets, and means for topping the beets.

6. A beet harvester comprising means for dividing the leaves and spreading the same laterally, means for bruising the stems of the spread leaves adjacent the crowns of the beets, means for severing the lateral portions of the spread leaves, means for loosening the soil surrounding the beets, and for elevating the beets of less height than the tallest beets, means for preventing the elevated beets being elevated beyond a predetermined distance above the surface of the soil, into the loosened earth, and means for topping the beets.

7. In a beet harvesting machine, a leaf divider for dividing the leaves and spreading the same laterally, means for bruising the leaf stems adjacent the crowns of the beet, means for loosening the soil surrounding the beets, and for elevating the beets of less height than the tallest beets, means for preventing the elevated beets being elevated beyond a predetermined distance above the surface of the soil, means for topping the beets, and means for digging the topped beets from the soil.

8. In a beet harvesting machine, a mechanism frame, a shaft rotatably supported by said frame and provided with a sprocket wheel, means for rotating said shaft, a second frame pivotally connected at its upper end to said frame and provided at its lower end with a shaft having a fixed sprocket wheel, means connecting said sprocket wheels for joint movement, a bruiser wheel fixed to said second frame shaft adapted to bruise the stems of the beet leaves as the machine travels over the beet row, and a leaf divider carried by the second frame adapted to spread the leaves laterally and downwardly before they are engaged by the bruiser wheel.

9. In a beet harvester, a leaf divider comprising two resilient rods connected together at their forward ends and having their rear ends extended downwardly and away from each other.

10. A beet harvesting machine comprising means for dividing the beet leaves and bruising the stems of the same adjacent the beet crowns, means for loosening the soil surrounding the beets and for elevating the beets of less height than the tallest beets, a horizontally movable belt for engaging the beet crowns to prevent the same rising beyond a predetermined distance above the soil, and means for topping the beets.

11. In a beet harvester, a mechanism frame, two sets of vertical posts adjustably secured at their upper ends to said frame, a shaft carried by each set of posts, means for imparting movement to one of said shafts, a pulley rigidly mounted on each of said shafts, and a beet leveling belt mounted on said pulleys.

12. In a beet harvesting machine, a mechanism frame, two sets of vertical posts adjustably secured at their upper ends to said frame, a link pivotally secured to the lower end of the post of one set, a link pivotally connected to the first link and also pivotally connected to one of the posts of the other set, shafts carried by each set of posts, means for imparting movement to one of said shafts, pulleys fixed to said shafts, and a beet leveling belt carried by said pulleys.

13. In a beet harvesting machine, an axle, side bars having their rear ends pivotally connected to said axle and provided at their front ends with a horizontal shaft, an intermediate frame, carrying the beet topping and harvesting means, mounted on said shaft, links connecting the side bars to the frame, and means for lifting said intermediate frame whereby said intermediate frame will swing about said shaft until the links commence to lift the side bars, when said side bars and intermediate frame will swing about the axle.

14. In a beet topping and harvesting machine, two traction wheels, an axle supported by said wheels, side bars having their rear ends pivotally secured to said axle and provided at their forward ends with a horizontal shaft, a mechanism frame mounted on said shaft, a tongue supported by said axle, a lever carried by said tongue, links connecting said intermediate frame to said side bars, and links connecting said intermediate frame to said lever.

15. The combination with a beet harvester, of means for loosening the soil surrounding the beets in a beet row and for elevating the beets, whose crowns extend a less distance above the ground than the crowns of the tallest beets, together with the soil which surrounds the same, means for preventing the elevated beets from being elevated beyond the crowns of the tallest beets, means for topping the beets while the tallest beets are supported in the soil and the beets of less height together with the soil which surrounds the same are held in elevated position by elevating means, and means for raising the topped beets from the soil.

16. A method of topping and harvesting beets consisting in loosening the earth surrounding the beets in a beet row, then elevating the beets, whose crowns extend a less distance above the surface of the ground than the crowns of the tallest beets, also elevating the soil surrounding the elevated beets and supporting the elevated beets in this soil, preventing the elevated beets from rising above the crowns of the tallest beets, and cutting the same amount of top from each beet.

In testimony whereof I affix my signature.

WILSON PRATT.

Copies of this patent may be obtained for five cents each, by addressing the "Commissioner of Patents, Washington, D. C."